US012559443B2

(12) United States Patent
Van Riet et al.

(10) Patent No.: US 12,559,443 B2
(45) Date of Patent: Feb. 24, 2026

(54) ENERGY-RELEASING COMPOSITE MATERIAL AND METHOD FOR MANUFACTURING SAME

(71) Applicants: Ecole Royale Militaire, Brussels (BE); Centre National de la Recherche Scientifique (CNRS), Paris (FR)

(72) Inventors: Romuald Jean-Pierre Van Riet, Evere (BE); Maria Concepcion Ovin Ania, Orléans (FR); Michel Henri Jean-Marie Lefebvre, Watermael-Boitsfort (BE); Peter Jean Joseph Lodewyckx, Kessel-Lo (BE)

(73) Assignees: Ecole Royale Militaire, Brussels (BE); Centre National de la Recherche Scientifique (CNRS), Paris (FR)

( * ) Notice: Subject to any disclaimer, the term of this patent is extended or adjusted under 35 U.S.C. 154(b) by 1081 days.

(21) Appl. No.: 17/602,829

(22) PCT Filed: Apr. 9, 2020

(86) PCT No.: PCT/EP2020/060267
§ 371 (c)(1),
(2) Date: Oct. 11, 2021

(87) PCT Pub. No.: WO2020/208195
PCT Pub. Date: Oct. 15, 2020

(65) Prior Publication Data
US 2022/0144720 A1     May 12, 2022

(30) Foreign Application Priority Data
Apr. 9, 2019     (BE) .................................. 2019/5228

(51) Int. Cl.
*C06B 21/00* (2006.01)
*C01B 32/15* (2017.01)
*C06B 45/04* (2006.01)

(52) U.S. Cl.
CPC .......... *C06B 21/0083* (2013.01); *C01B 32/15* (2017.08); *C06B 45/04* (2013.01); *C01P 2004/61* (2013.01); *C01P 2006/14* (2013.01); *C01P 2006/16* (2013.01)

(58) Field of Classification Search
None
See application file for complete search history.

(56) References Cited

U.S. PATENT DOCUMENTS

| | | | |
|---|---|---|---|
| 6,666,935 B1 | 12/2003 | Simpson et al. | |
| 2003/0097953 A1 | 5/2003 | Serizawa et al. | |
| 2005/0072502 A1* | 4/2005 | Hofmann | C06B 33/00 149/37 |

FOREIGN PATENT DOCUMENTS

| | | |
|---|---|---|
| EP | 2045230 | 4/2009 |
| EP | 2138180 | 12/2009 |
| GB | 534900 | 3/1941 |

OTHER PUBLICATIONS

Rapport de Recherche Internationale et l'Opinion Ecrite [International Search Report and the Written Opinion] Dated Jul. 17, 2020 From the International Searching Authority Re. Application No. PCT/EP2020/060267 and Its Translation of Search Report Into English. (12 Pages).

* cited by examiner

*Primary Examiner* — Aileen B Felton

(57) ABSTRACT

The invention relates to an energy-releasing composite material comprising at least one nanoporous material and at least one inorganic oxidant, characterised in that said nanoporous material is a nanoporous carbon material.

29 Claims, 7 Drawing Sheets

Pore diameter  (nm)

| Material | $S_{BET}$ (m²/g) | $V_{DR}$ (cm³/g) | $V_{mesopores}$ (cm³/g) |
| --- | --- | --- | --- |
| C granular | 1143 | 0.38 | 0.54 |

| Material | $S_{BET}$ (m²/g) | $V_{DR}$ (cm³/g) | $V_{mesopores}$ (cm³/g) |
|---|---|---|---|
| F5001 | 2606 | 0.85 | 1.83 |

Main textural parameters of pristine nanoporous carbons and after filling with sodium perchlorate.

| Material | $S_{BET}$ (m²/g) | $V_{micropores}$ (cm³/g) | $V_{mesopores}$ (cm³/g) |
|---|---|---|---|
| NaClO$_4$ | 8 | 0.001 | -- |
| Carbon CC | 1151 | 0.41 | 0.49 |
| Composite CC/NaClO$_4$ (filled 2.2 g/g) | 57 | 0.02 | 0.05 |
| Physical mixture 1 g CC + 2.2 g NaClO$_4$ | 203 | 0.11 | 0.13 |
| Carbon FC | 2595 | 0.72 | 1.62 |
| Composite FC/NaClO4 (filled 3.2 g/g) | 352 | 0.11 | 0.23 |
| Physical mixture 1 g FC + 3.2 g NaClO$_4$ | 587 | 0.16 | 0.37 |

*Fig. 11*

Changes in medium pore size (w) assessed from pore size distributions obtained using the 2D-NLDFT-HS method.

| | w < 0.9 nm | 0.9<w<5 nm | w>5 nm |
|---|---|---|---|
| Pristine carbon CC | 13 % | 54 % | 34 % |
| Composite CC/NaClO$_4$ (filled 2.20 g/g) | 5 % | 44 % | 52 % |
| Physical mixture 1 g CC + 2.2 g NaClO$_4$ | 13 % | 52 % | 35 % |
| | w< 1.3 nm | 1.3<w<5 nm | w>5 nm |
| Pristine carbon FC | 12 % | 46 % | 42 % |
| Composite FC/NaClO$_4$ (filled 3.2 g/g) | 14 % | 33 % | 52 % |
| Physical mixture 1 g FC + 3.2 g NaClO$_4$ | 13 % | 46 % | 41 % |

*Fig. 12*

ENERGY-RELEASING COMPOSITE MATERIAL AND METHOD FOR MANUFACTURING SAME

RELATED APPLICATIONS

This application is a National Phase of PCT Patent Application No. PCT/EP2020/060267 having International filing date of Apr. 9, 2020, which claims the benefit of priority of Belgium Patent Application No. 2019/5228 filed on Apr. 9, 2019. The contents of the above applications are all incorporated by reference as if fully set forth herein in their entirety.

FIELD AND BACKGROUND OF THE INVENTION

The present invention relates to a composite energetic material comprising at least one nanoporous material and at least one inorganic oxidiser as well as to the manufacturing method thereof.

An energetic material is a material or mixture of materials capable of rapidly releasing energy via chemical reaction. Energetic materials are generally categorised into 3 classes depending on their application: propellant powders, high explosives and pyrotechnic compositions. Pyrotechnic materials and propellant powders release energy via a deflagration process, whereas explosives release energy via a detonation process.

Energetic materials are also grouped into two main groups, depending on their composition.

The first group consists of energetic materials consisting of a substance with oxidising groups on the one hand and fuel groups on the other hand, on a molecular scale. These are energetic materials such as trinitrotoluene, hexogen (RDX), octogen (HMX), nitrocellulose and nitroglycerine.

In this first group, there are relatively old materials, used since the Second World War and that are the now subject to great difficulties (such as nitrocellulose, which has problems of chemical instability, or primary explosives containing lead, which is being banned by the REACH regulation). Furthermore, there is some current research aiming to replace these old materials with materials that have a more complex molecular structure. However, industrial production is not yet a reality, since the compromise between cost and performance has not yet been reached.

The second group consists of energetic materials comprising an oxidiser and a fuel in the form of a mixture or composite energetic materials. A composite energetic material is a mixture of substances, one of which mainly has an oxidising character (the oxidiser) and the other mainly has a fuel character.

For example, composite propellant is an energetic material par excellence, used as a propellant powder for rockets. This material consists of an oxidiser such as ammonium perchlorate, and aluminium powder in a polymer matrix which serves as a fuel (e.g. HTPB—hydroxyl-terminated polybutadiene). The aluminium also serves as a fuel.

However, this propellant is difficult to put together in engines and produces toxic fumes (HCl) while having limited performance in terms of combustion properties. The particles used (oxidiser and aluminium) are micrometric, and research is currently focused on reducing the size of these particles to the nanometric scale. These nanoparticles, while allowing greater performance to be achieved, nevertheless remain extremely costly to produce and present dangers in terms of toxicity and ecotoxicity.

This second group also includes composite energetic materials comprising at least one oxidiser and at least one nanoporous material based on nanoporous silicon which acts as fuel.

The term 'nanoporous material' is understood to be a material comprising pores of nanometric size, i.e. with a size of less than 100 nm. The term 'nanoporous', when referring to a material, means that the material comprises micropores, mesopores and macropores with an upper limit of approximately 100 nm. These nanoporous materials comprise micropores with a pore size not exceeding 2 nm, mesopores with an intermediate size of between 2 and 50 nm and macropores with a pore size of greater than 50 nm. This definition is taken from the nomenclature of the International Union of Pure and Applied Chemistry (IUPAC, see 'Physisorption of gases, with special reference to the evaluation', compiled by M. Thommes et al. IUPAC 2015 Pure Appl. Chem. 2015: 87 (9-10):1051-1069.

The document 'A decade of porous silicon as nano-explosive material', Monuko du Plessis, pages 1-17, describes, by way of example, an energetic material based on porous silicon in the form of a wafer or thin layer which has nanopores on the surface of the porous silicon. The nanopores are filled with an oxidiser and have a molar ratio of oxidiser to silicon of between 0.1 and 0.5.

The document refers to the production of a flash of light and an audible 'pop' when concentrated nitric acid was dripped onto the surface of a porous silicon wafer, which could not be reproduced with drops of sulfuric acid. According to the authors, only anodised porous silicon showed a violent reaction.

Additionally, reference is made to the preparation of silicon nanoparticles with a diameter of between 7 and 20 nm on which a drop of concentrated nitric acid produced an extremely bright flash of light that was maintained over time.

This document also states that it has been reported that it is possible to perform nano-explosions at cryogenic temperatures on porous silicon in the presence of liquid oxygen. This is because porous silicon has pores whose inner surface is almost completely covered with hydrogen.

The conclusion, according to the authors, is that the type of oxidiser, the morphology and the structure of porous silicon determines the explosive category of the material. Although silicon nanoparticles have a much higher first-order linear oxidation constant than porous silicon wafers or thin layers and even higher than that of organic energetic materials, these nanoparticles show numerous limitations in both the applications and the conditions necessary to demonstrate their energetic character.

This document focuses on the preparation of porous silicon by an electrochemical etching technique in a porogenic electrolyte comprising hydrofluoric acid HF and ethanol. This allows the creation of pores whose inner surface is covered with hydrogen forming $Si—H_x$ groups which will be replaced over time by $Si—O_x$ groups in the presence of nitrate impregnation. The presence of these $Si—O_x$ groups results in, according to this document, an instability of the energetic material over time.

Furthermore, nanoporous silicon is produced in a thin layer of a few micrometres and is therefore considered a two-dimensional material in which the oxidiser only reaches the surface pores and is unable to penetrate the deep porosity of nanoporous silicon. Furthermore, during combustion in the presence of the oxidiser, silicon dioxide is produced which will quickly change to a condensed liquid or solid phase, which further limits applications.

Moreover, practical large-scale applications seem to be compromised for this type of nanoporous silicon. Synthesis methods are extremely costly, and the resulting materials present toxicity and environmental problems.

Also known from document EP 2 045 230 is an energetic composition with controlled decomposition comprising an organic material and a porous material with a void ratio at least equal to 10%. The organic material consists of an explosive or non-explosive, organic or inorganic material, for example hexogen (RDX), octogen (HMX), hexanitro-hexaazaisowurtzitane (CL 20), penthrite (PETN) or oxyni-trotriazole (ONTA); ammonium perchlorate, potassium per-chlorate, sodium perchlorate, ammonium or potassium nitrate, sodium or potassium azide, barium peroxide or even a material that may be gassed but is not explosive (polymers, porogenic agents, oxalates, etc.). The porous material is a micro-, meso-, or macroporous material and may be an oxide, a metal, a metalloid or an inorganic or organic material such as carbon nanotubes. Unfortunately, this com-position requires the addition of a reducing or oxidising material to obtain useful performance effects.

Furthermore, applications of this type of composition are limited to pyrotechnics.

Also known from document U.S. Pat. No. 6,666,935 is an energetic material comprising a polycondensation product of resorcinol with formaldehyde (resin), used as a porous material with an oxidiser.

Unfortunately, combustion of this type of material is much less energetic because a significant portion of the carbon is already oxidised, thus limiting the energy released during the reaction.

In view of the above, there is therefore a general need for composite energetic materials that combine high perfor-mance, safety, reactivity and versatility and that can be produced in a reproducible manner and in industrial quan-tities.

SUMMARY OF THE INVENTION

The present invention aims to address this need and the aforementioned disadvantages by providing a composite energetic material that combines performance, safety, reac-tivity and versatility and that can be produced in a repro-ducible and simple manner.

For this purpose, the present invention provides a com-posite energetic material as mentioned at the beginning, characterised in that said nanoporous material is a nanop-orous carbonaceous material, said composite energetic material having a decomposition initiation temperature on a thermogram obtained by differential scanning calorimetry of less than 5° C./minute in a closed crucible (DSC peak start temperature) preferably from 50° C. to 200° C., more preferably from 100° C. to 150° C., relative to the decom-position initiation temperature on the DSC thermogram of the inorganic oxidiser, said energetic material having and has at least 30%, preferably at least 50%, particularly preferably at least 70%, even more preferably at least 80% of the porosity occupied by said inorganic oxidiser and at most 90% of the porosity, preferably at most 95%, more particularly at most 97%, more preferably at most 98%, even more preferably at most 99.9% of the porosity occupied by said inorganic oxidiser, said energetic material having an impact sensitivity of at least 2 J.

A 'nanoporous carbonaceous material' according to the present invention is understood as a nanoporous carbona-ceous material formed mainly of carbon, for example, comprising at least 70% by weight of carbon relative to the total weight of said nanoporous carbonaceous material, and comprising a network of interconnected pores in a three-dimensional arrangement of pores which extend through the volume of the nanoporous carbonaceous material particles. As mentioned above, the nanoporous carbonaceous material comprises at least micropores with a pore size not exceeding 2 nm or mesopores with an intermediate size of between 2 and 50 nm or both micropores and mesopores and optionally macropores with a pore size greater than 50 nm. Such nanoporous carbonaceous material is to be distinguished from carbon nanotubes because carbon nanotubes do not have pores in a three-dimensional arrangement, but instead the porosity is one-dimensional, which removes any three-dimensional mechanical properties of the material. The nanoporous carbonaceous material according to the present invention therefore has a continuous matrix with said three-dimensional disordered or ordered porosity, contrary to an agglomerate of carbon nanotubes formed by an assembly of nanotubes in which there is no continuous matrix.

Typically, such three-dimensional porosity is observable by conventional techniques well known to specialists in the field, such as mercury porosimetry or gas adsorption poro-simetry (typically nitrogen or argon at cryogenic tempera-ture).

'Decomposition initiation temperature' is understood as the decomposition peak start temperature on a thermogram obtained by differential scanning calorimetry of less than 5° C./minute in a closed crucible.

Therefore, it has been surprisingly demonstrated that it was possible to produce, from a nanoporous carbonaceous material, a low-cost, industrial-scale energetic material that does not present toxicity or ecotoxicity while maintaining a very good ratio between performance and sensitivity of the composite energetic material according to the present inven-tion.

The energetic material according to the present invention has a remarkably high adsorption capacity of the oxidiser, followed by a filling of the different types of pores of the total porosity, making it possible to obtain a high ratio of oxidiser to fuel, also due to intermolecular interactions between the nanoporous carbonaceous material and the inorganic oxidiser. The nanoporous carbonaceous material, due to the decomposition initiation temperature difference between the composite energetic material and the pure oxidiser is able to achieve the performance of a nanometric composite energetic material without the disadvantages of the nanoscale. This material does not contain free nanopar-ticles.

According to the present invention, as indicated previ-ously, at least 30%, preferably at least 50%, particularly preferentially at least 70%, even more preferentially at least 80% of the porosity of the energetic material is occupied by said inorganic oxidiser, and at most 90% of the porosity, preferably at most 95%, more particularly at most 97%, more preferentially at most 98%, even more preferably at most 99.9% of the porosity of the energetic material is occupied by said inorganic oxidiser. The % of the porosity occupied by said inorganic oxidiser may be measured in two ways.

According to a first method, the porosity (pore volume) ($P_c$) of the nanoporous carbonaceous material is measured before impregnation with said inorganic oxidiser and the porosity of the energetic material (pore volume per unit mass of nanoporous carbon (Pme)). Next, $P_{me}$ is subtracted from $P_c$ to obtain the pore volume occupied by the inorganic oxidiser and this pore volume is compared to the starting pore volume according to the formula:

$$\frac{P_c - P_{me}}{P_c}$$

The porosity $P_c$ of the nanoporous carbonaceous material is the sum of the pore volume of the micropores $V_{mc}$ C and the pore volume of the mesopores $V_{ms}$ C.

The pore volume of the micropores $V_{mc}$ C of the nanoporous carbonaceous material is calculated by applying the Dubinin-Radushkevitch model applied to nitrogen adsorption isotherms at 77.4K.

The pore volume of the micropores $V_{mc}$ C of the nanoporous carbonaceous material may also be calculated based on the pore size distribution modelled by 2D-NLDFT-HS (2D-non-linear DFT-HS) or QSDFT (quench-state DFT) applied to nitrogen adsorption isotherms at 77.4K.

The pore volume of the mesopores $V_{ms}$ C of the nanoporous carbonaceous material is calculated based on the pore size distribution modelled by 2D-NLDFT-HS (2D-non-linear DFT-HS) or QSDFT (quench-state DFT) applied to nitrogen adsorption isotherms at 77.4K.

The porosity $P_{me}$ of the energetic material (pore volume per unit mass of nanoporous carbon) is the sum of the pore volume of the micropores $V_{mc}$ ME and the pore volume of the mesopores $V_{ms}$ ME (both per unit mass of nanoporous carbon).

The pore volume of the micropores $V_{mc}$ ME of the energetic material is calculated by applying the Dubinin-Radushkevitch model applied to nitrogen adsorption isotherms at 77.4K.

The pore volume of the micropores $V_{mc}$ ME of the nanoporous carbonaceous material may also be calculated based on the pore size distribution modelled by 2D-NLDFT-HS (2D-non-linear DFT-HS) or QSDFT (quench-state DFT) applied to nitrogen adsorption isotherms at 77.4K.

The pore volume of the mesopores $V_{ms}$ ME of the energetic material is calculated based on the pore size distribution modelled by 2D-NLDFT-HS (2D-non-linear DFT-HS) or QSDFT (quench-state DFT) applied to nitrogen adsorption isotherms at 77.4K.

According to a second method, the porosity (pore volume) of the energetic material ($P_{me}$) as well as the porosity of the energetic material ($P_{me}$ L) are measured after a series of 3 consecutive leaches with water or a solvent of said inorganic oxidiser for 24 h at a temperature of 75° C. in a closed chamber. Each leaching is performed with a minimum volume of solvent equal to 1 dm³ of solvent per g of energetic material. The name of leaches may be increased if the solvent after leaching still contains detectable traces of inorganic oxidiser. These traces can be quantified by elemental analysis or by a suitable spectrometric technique. Next, $P_{me}$ is subtracted from $P_{me}$ L to obtain the pore volume occupied by the inorganic oxidiser and this pore volume is compared to the starting pore volume according to the formula:

$$\frac{P_{me}L - P_{me}}{P_{me}L}$$

The porosity $P_{me}$ is calculated as in the first method above.

The porosity of the energetic material (pore volume per unit mass of nanoporous carbon) after leaching $P_{me}$ L is the sum of the pore volume of the micropores $V_{mc}$ MEL and the pore volume of the mesopores $V_{ms}$ MEL (both per unit mass of nanoporous carbon).

The pore volume of the micropores $V_{mc}$ MEL of the leached energetic material is calculated by applying the Dubinin-Radushkevitch model applied to nitrogen adsorption isotherms at 77.4K.

The pore volume of the micropores $V_{mc}$ MEL of the nanoporous carbonaceous material may also be calculated based on the pore size distribution modelled by 2D-NLDFT-HS (2D-non-linear DFT-HS) or QSDFT (quench-state DFT) applied to nitrogen adsorption isotherms at 77.4K.

The pore volume of the mesopores $V_{ms}$ MEL of the leached energetic material is calculated based on the pore size distribution modelled by 2D-NLDFT-HS (2D-non-linear DFT-HS) or QSDFT (quench-state DFT) applied to nitrogen adsorption isotherms at 77.4K.

According to the present invention, it has been shown, by the initiation temperature, that the energetic material according to the invention decomposes very quickly and very violently when heated at atmospheric pressure. The energetic material detonates or causes a very rapid deflagration. The violence of the reaction is remarkable and close to that observed for extremely reactive materials such as lead azides. Furthermore, compared with physical mixtures containing the same ratios and natures of nanoporous carbonaceous material and inorganic oxidiser as the energetic material according to the present invention, the violence of the reaction of the physical mixture is significantly lower because the decomposition reaction of the material is limited to the micrometre scale. However, without being certain, it is believed that this is due to the fact that the reactivity is high in small pores of less than 1 nm. When decomposition occurs in these small pores, heat is transferred to the material surrounding the small pores and initiates the decomposition reaction in the larger pores. The fuel/oxidiser scale is three orders of magnitude smaller in the energetic material according to the invention than in the physical mixture mentioned above (namely<1 nm compared to 1 to 100 μm). It is believed that it is this nanometric scale, comparable to that of energetic molecules, that provides the observed reactivity.

During combustion, the composite energetic material, due to its carbonaceous nature, will produce gaseous products which remain in the gaseous state, allowing it to be used in different classes of energetic materials such as high explosives, propellant powders and pyrotechnic compositions. Furthermore, the structure of the nanoporous carbonaceous material with strong carbon-carbon bonds provides the composite energetic material with excellent mechanical properties, good impact sensitivity of at least 2J and good thermal stability, the explosive nature of which is controlled, enhancing the safety of users and handlers without adversely affecting the energetic performance of the composite material according to the invention.

It should be noted that the minimum impact sensitivity required to be transported is 2 J (Orange Book UN).

Preferably, the decomposition energy of the composite energetic material according to the present invention is at least 2000 J/g. The decomposition energy according to the present invention is the integral of the decomposition peak on a thermogram obtained by differential scanning calorimetry performed in a closed crucible. Since the decomposition energy of the composite energetic material is at least 2000 J/g, the energetic performance is considerably better than the energetic performance of existing composite energetic materials.

Contrary to nanoporous silicon synthesised in thin layers of a few micrometres, nanoporous carbon is a versatile three-dimensional material that has been used as a separation medium for a very long time. This material has been studied and described extensively in the literature.

Today, nanoporous carbon is produced on an industrial scale in the form of powder, grains or monoliths. Furthermore, it promotes the thermal stability of energetic compositions and their sensitivity, as mentioned above. Nanoporous carbon has textural properties and a surface chemistry which can be easily modified as needed and in a controlled manner to obtain relatively insensitive energetic nanomaterials with high performance as a high explosive or propellant powder.

Nanoporous carbonaceous materials are, in fact, characterised by a three-dimensional nanoporous network that allows the combination of mechanical strength properties and the presence of a large volume of micropores and mesopores in the nanoporous carbonaceous material. The mechanical properties are the result of the carbon-carbon bonds that give the material high strength. Furthermore, the surface of nanoporous carbonaceous materials is stable and does not oxidise. Therefore, it is capable of completely fulfilling its role as a fuel, unlike silicon or aluminium, for example, whose surface is oxidised when in contact with air and on which a layer of native oxide forms.

The composite energetic material according to the present invention therefore has high strength mechanical properties while having a large quantity of oxidiser mainly present in the large volume of micropores and mesopores, providing, on the one hand, performance to the energetic material, but also versatility, while ensuring, on the other hand, the required safety.

Advantageously, the composite energetic material of the present invention has a bulk density greater than or equal to 1.0 g/cm³, preferably greater than or equal to 1.25 g/cm³, more preferentially greater than 1.35 g/cm³ and even more preferentially greater than 1.5 g/cm³. A high bulk density is linked to better performance in applications such as propellant powders and high explosives. A high bulk density makes it possible to increase the energy density of the composite energetic material.

In an advantageous embodiment, the composite energetic material has a micropore volume of pores with a diameter of less than 2 nm of between 0.01 cm³/g and 1.0 cm³/g, calculated by applying the Dubinin-Radushkevitch model applied to nitrogen adsorption isotherms at 77.4K. Also advantageously, the composite energetic material according to the invention has a mesopore volume of pores with a diameter of between 2 nm and 50 nm of between 0.05 cm³/g and 3.0 cm³/g, calculated based on the pore size distribution modelled by 2D-NLDFT-HS (2D-non-linear DFT-HS) or QSDFT (quench-state DFT) applied to nitrogen adsorption isotherms at 77.4K.

In a particular embodiment, the composite energetic material according to the invention comprises a nanoporous carbonaceous material which is granular, and which has a $D_{90}$ greater than or equal to 160 microns and a $D_{10}$ greater than or equal to 900 microns.

Advantageously, the composite energetic material according to the invention is in powder form. Even more advantageously, the particle size of the powder is between 25 μm and 50 μm.

In another embodiment, the composite energetic material of the invention is in monolithic form. It is useful to be able to use the composite energetic material according to the invention in different forms. This allows the texture or surface chemistry of said composite energetic material to be modified according to the desired purpose.

Advantageously, the composite energetic material according to the invention comprises the inorganic oxidiser selected from the group of salts of the general formula $X_aZ_bO_c$ where a and b are integers between 0 and 5 and where c represents an integer between 1 and 8, with X representing a counter anion selected from Na, K, NH₄, Li, H, Ca, Mg, Al or Fe as well as combinations thereof, with Z representing Mn, Cl, N, S, I, P and O representing oxygen.

Other embodiments of the composite energetic material according to the invention are mentioned in the appended claims.

The invention also relates to an energetic formulation which comprises the composite energetic material according to the present invention.

In another embodiment, the energetic formulation further comprises at least one conventional additive such as an energetic or non-energetic plasticiser, a shaping material, a stabiliser, an oxidiser, the same or different, a flash suppressor or graphite.

Other embodiments of the energetic formulation according to the invention are mentioned in the appended claims.

The invention also refers to the use of the composite energetic material of the present invention for manufacturing an energetic formulation.

Other embodiments of use of the composite energetic material according to the present invention are mentioned in the appended claims.

The invention also relates to a method of producing a composite energetic material.

Methods of producing composite energetic materials are known. One of these methods is mentioned in the section on existing technologies in the document 'A decade of porous silicon as nano-explosive material', Monuko du Plessis, pages 1-17.

It is reported that a composite energetic material made from nanoporous silicon wafers could be made by dripping an oxidiser onto the surface of nanoporous silicon. The solution containing the oxidiser is absorbed into the pores via capillarity. When the first two drops have dried (appear visually dry), a deposit of two more drops is made. However, such a method requires a waiting time between each deposit of two drops and does not allow a total impregnation of the porous silicon wafer, only the exposed surface.

Another method consists of repeatedly depositing an oxidiser on the surface of the porous silicon wafer.

Unfortunately, in the two methods mentioned above, the way of producing the energetic material remains quite laborious and unfeasible on an industrial scale. The constraints are very high and there is no guarantee of achieving a relatively stable, but efficient product.

More particularly, the present invention relates to a method of producing a composite energetic material comprising the following steps:
  a) Immersing said at least nanoporous material in said at least one oxidiser present in a fluid;
  b) Impregnating said at least one nanoporous material with said at least one oxidiser present in a fluid;
  c) Obtaining a composite energetic material.

Such a method is also described in the document 'A decade of porous silicon as nano-explosive material', Monuko du Plessis, pages 1-1 according to which a nanoporous silicon is immersed in an oxidiser to produce a composite energetic material.

Although this method describes a simplified production by completely immersing the nanoporous silicon wafer for a higher oxidiser impregnation than that performed in the previously described methods, said impregnation actually occurs only in the pores present at or near the surface of the porous silicon.

Unfortunately, the nanoporous material used is nanoporous silicon, the preparation of which is delicate and costly. It depends on a poorly controllable etching technique that may quickly lead to silicon instability.

Consequently, the composite energetic material obtained by this prior method is difficult to handle and the manufacturing method is relatively constraining to implement, among other things, due to the affinity of the nanoporous silicon for organic compounds and the hydrophobicity of its surface, requiring relatively aggressive production steps.

The fluid used is always a solution and, since the surface of the porous silicon is hydrophobic, water is not used as the solution solvent but instead the immersion solution solvent is ethanol, methanol, acetone or $CS_2$. These compounds are more costly, volatile and sometimes toxic. Since most salts are more soluble in water than in substances such as ethanol, methanol, acetone or $CS_2$, when they are used with said substances, the quantity of oxidiser dissolved and therefore available for impregnation is less than if the oxidiser is dissolved in water. Furthermore, this limits the choice of oxidisers that can be used.

Furthermore, according to this prior document, impregnation is performed under strict conditions. It is performed in vacuo, making interactions, as well as production on an industrial scale, more complicated.

Furthermore, according to this document, when the energetic material is obtained, part of the oxidiser exudes from the pores of the nanoporous silicon. This confirms the instability of nanoporous silicon which is known to have a very strong affinity for hydrogen with which silicon atoms bond. Document EP 2 138 180 also describes an impregnation of nanoporous silicon with an oxidiser to make therapeutic nanobombs.

Also known from document US 2003/097953 are methods of producing energetic materials for manufacturing airbags containing inorganic oxidiser and activated carbon and ethanol in the presence of a radical scavenger containing chlorine. Ethanol is used as a dispersing agent for powdered particles of activated carbon, inorganic oxidiser and chlorinated radical scavengers to produce a homogenous mixture without impregnation.

Also known from document GB 500 934 is a method of producing explosives using a porous carrier such as cellulose esters, regenerated celluloses, or ethers, and liquid explosives containing nitro-glycerine which are put in competition with an inorganic oxidiser to allow absorption thereof.

Finally, known from document U.S. Pat. No. 6,666,935 is energetic material in the form of xerogels.

The present invention provides a method of producing a composite energetic material comprising the above steps, characterised in that said nanoporous material is a nanoporous carbonaceous material; and in that said impregnation step comprises an adsorption of said at least one oxidiser into the micropores, mesopores and macropores forming a core at a temperature of between 0 and 50° C., preferably between 15 and 30° C., preferably between 18 and 28° C., more preferentially between 20 and 26° C., said adsorption being followed by a filling of the free micropores, mesopores and macropores with said oxidiser.

In the method according to the present invention, the production of the energetic material is simple to implement, not requiring an in-vacuo step or a drastic lowering of the temperature. The nanoporous carbonaceous material has sufficient affinity for the oxidiser relative to the molecules present in ambient air to not require constraining steps of competition with the oxidiser. Furthermore, the nanoporous carbonaceous material has a three-dimensional pore structure which, even at room temperature, provides mechanical stability to the energetic material thus produced.

The impregnation step of the method according to the present invention is preferentially performed in several steps. A first impregnation of the inorganic oxidiser is performed in the nanopores of the nanoporous carbonaceous material resulting in a solid phase in the smallest pores which will form the core. A second impregnation or a series of subsequent impregnation(s) for 1 hour to 10 days with the inorganic oxidiser is then performed allowing the enrichment of the energetic material with the inorganic oxidiser. The impregnation(s) may be followed by drying. The solution of inorganic oxidiser used is preferably a saturated aqueous solution, previously filtered.

In view of this, it was surprisingly demonstrated that it was possible to use a nanoporous carbonaceous material that is widely commercially available and simple to manufacture, that is easy to handle without requiring constraining conditions for producing the energetic material, providing the necessary fuel for the energetic material and capable of containing by adsorption sufficient oxidiser to provide it with performance as an energetic material, versatility (the energetic material has explosive performance as well as propellant performance), as well as safety and simplicity in production.

Moreover, although the nanoporous carbonaceous material is hydrophobic like nanoporous silicon, it is all the more surprising, when the fluid is a polar hydrophilic fluid such as a water-based solvent, to obtain an adsorption of the oxidiser in the micropores, mesopores and macropores, i.e. even the nanopores present in depth, of said nanoporous carbonaceous material. Advantageously, the nanoporous carbonaceous material is a nanoporous carbonaceous material in the form of nanoporous carbonaceous particles.

Advantageously, the energetic material according to the present invention contains a ratio between the atomic fraction of free oxygen of the oxidiser relative to the carbon contained in the nanoporous carbonaceous material of between 0.5 and 2.5, preferably between 1 and 2.2 and more preferably around 2.

In a preferred embodiment, the minimum carbon content of said nanoporous carbonaceous material in the composite energetic material according to the present invention is greater than 70% by weight of carbon, preferably greater than 80% by weight of carbon, more particularly greater than 90% by weight of carbon relative to the total weight of said nanoporous carbonaceous material.

Advantageously, the fluid in the method according to the present invention is a liquid phase comprising said inorganic oxidiser in a solvent, for example, a polar solvent such as water, dimethyl sulfoxide (DMSO) or acetone.

Advantageously, said liquid phase of the fluid in the method according to the present invention is a saturated colloidal solution or suspension of said inorganic oxidiser.

Equally advantageously, the filling of free micropores, mesopores and macropores in the method according to the present invention is performed by evaporation, filtration, vaporisation, extraction, lyophilisation, cryodesiccation or a combination thereof.

Preferably, before the composite energetic material is obtained, a rinsing step with a rinsing solvent and a removal of the rinsing solvent, optionally loaded with excess inorganic oxidiser by evaporation, filtration, vaporisation, extraction, lyophilisation, cryodesiccation, drying or a combination thereof.

In another, equally advantageous embodiment, the method according to the present invention, the nanoporous carbonaceous material is immersed in said fluid while stirring.

Advantageously, said predetermined time period of the method according to the present invention is between 10 minutes and 10 days, preferably between 1 hour and 8 days, more particularly between 4 and 7 days, even more particularly between 6 hours and 6 days.

Advantageously, said inorganic oxidiser in the method according to the present invention is selected from the group of salts of the general formula $X_aZ_bO_c$ where a and b are integers between 0 and 5, and where c represents an integer between 1 and 8, with X representing a counter anion selected from Na, K, $NH_4$, Li, H, Ca, Mg, Al or Fe, as well as combinations thereof, with Z representing Mn, Cl, N, S, P, I and O representing oxygen.

Preferably, the method according to the present invention comprises said nanoporous carbonaceous material with a micropore volume of pores with a diameter of less than 2 nm of between 0.1 $cm^3$/g and 1.0 $cm^3$/g, calculated by applying the Dubinin-Radushkevitch model applied to nitrogen adsorption isotherms at 77.4K.

Advantageously, the method according to the present invention comprises said nanoporous carbonaceous particles having a mesopore volume of pores with a diameter of between 2 nm and 50 nm of between 0.05 $cm^3$/g and 3.0 $cm^3$/g, calculated based on the pore size distribution modelled by 2D-NLDFT-HS (non-linear DFT) or QSDFT (quench-state DFT) applied to nitrogen adsorption isotherms at 77.4K.

In a preferred embodiment, the method according to the present invention comprises said nanoporous carbonaceous material in granular form with a $D_{90}$ greater than or equal to 160 microns and a $D_{10}$ greater than or equal to 900 microns.

The notation $D_x$ represents a diameter, expressed in µm, in relation to which X % of the measured particles or grains are smaller.

In a preferred embodiment, the method according to the present invention comprises said nanoporous carbonaceous material in the form of a powder.

In a preferred embodiment, the method according to the present invention comprises said nanoporous carbonaceous material in the form of a monolith.

Advantageously, the method according to the present invention comprises said recovered composite energetic material with a bulk density greater than or equal to 1.0 $g/cm^3$, preferably greater than or equal to 1.25 $g/cm^3$, more preferentially greater than 1.35 $g/cm^3$ and even more preferentially greater than 1.5 $g/cm^3$.

Other embodiments of the method according to the invention are mentioned in the appended claims.

BRIEF DESCRIPTION OF THE SEVERAL VIEWS OF THE DRAWINGS

Other characteristics, details and advantages of the invention will emerge from the following description, which is non-limiting and refers to the drawings and examples.

In the drawings.

FIG. 11 is a table containing the BET surface area, micropore volume and mesopore volume of the nanoporous carbonaceous material C-Granular (CC) and the material F5001 (FC) as a reference, of the materials according to Examples 9, 10 and Comparative Examples 1 and 2.

FIG. 12 is a table containing the change in average pore size (W) evaluated from the pore size distributions obtained using the 2D-NLDFT-HS model of the nanoporous carbonaceous material C-Granular (CC) and the material F5001 (FC) as a reference, of the materials according to Examples 9, 10 and Comparative Examples 1 and 2.

DESCRIPTION OF SPECIFIC EMBODIMENTS OF THE INVENTION

Examples

Example 1: Characterisation of the Pore Structure of the Nanoporous Carbonaceous Material C-Granular (GAC) Available from Cabot Norit, Hereafter Referred to as C-Granular A commercial nanoporous carbonaceous material, C-Granular, which has a large volume of micropores and mesopores, was selected and studied. Firstly, C-Granular was crushed and then sieved to only recover particles with a particle size between 500 and 630 μm.

Figure 1:
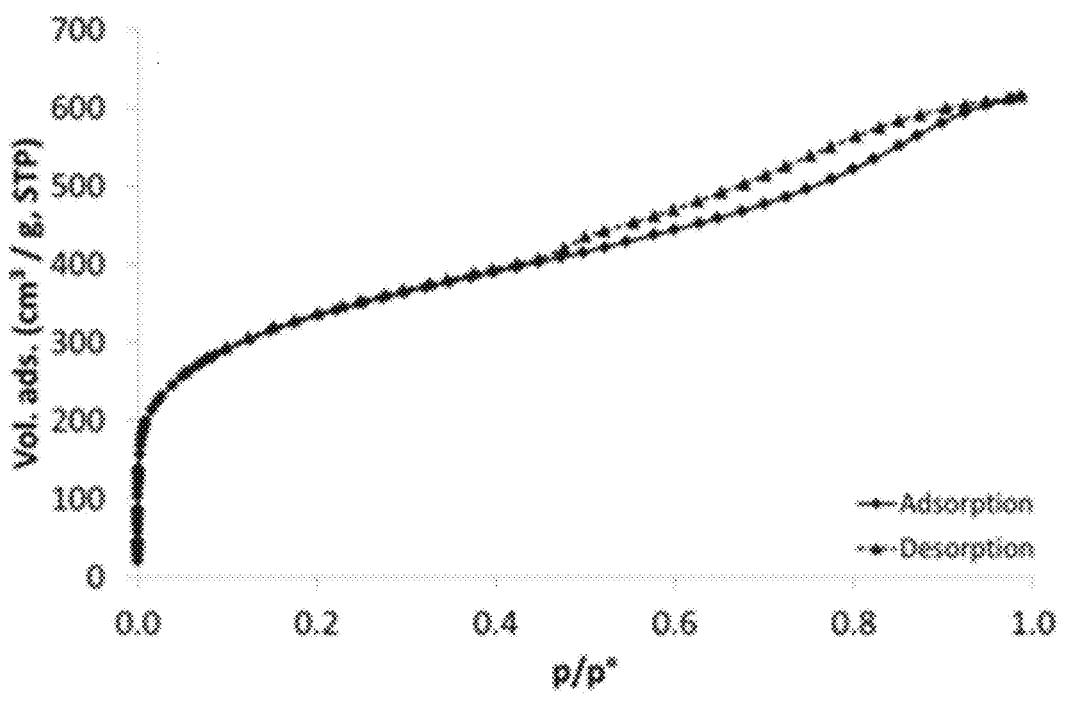
FIG. 1 is a graph showing the nitrogen adsorption isotherms (adsorbed micropore volume to relative pressure) of the nanoporous carbonaceous material C-Granular (GAC), available from Cabot Norit, calculated by high-resolution nitrogen adsorption isotherms at 77.4K.

The pore structure was characterised by high-resolution nitrogen adsorption isotherms at 77.4K for C-Granular. The nanoporous carbonaceous material C-Granular was previously degassed at 120° C. for 17 hours in vacuo at a pressure of $10^{-5}$-$10^{-6}$ Torr. Firstly, as can be seen in FIG. 1, nitrogen adsorption was measured on the surface of C-Granular until an equilibrium was formed between the nitrogen pressure and the quantity of nitrogen absorbed by C-Granular.

Figure 2:
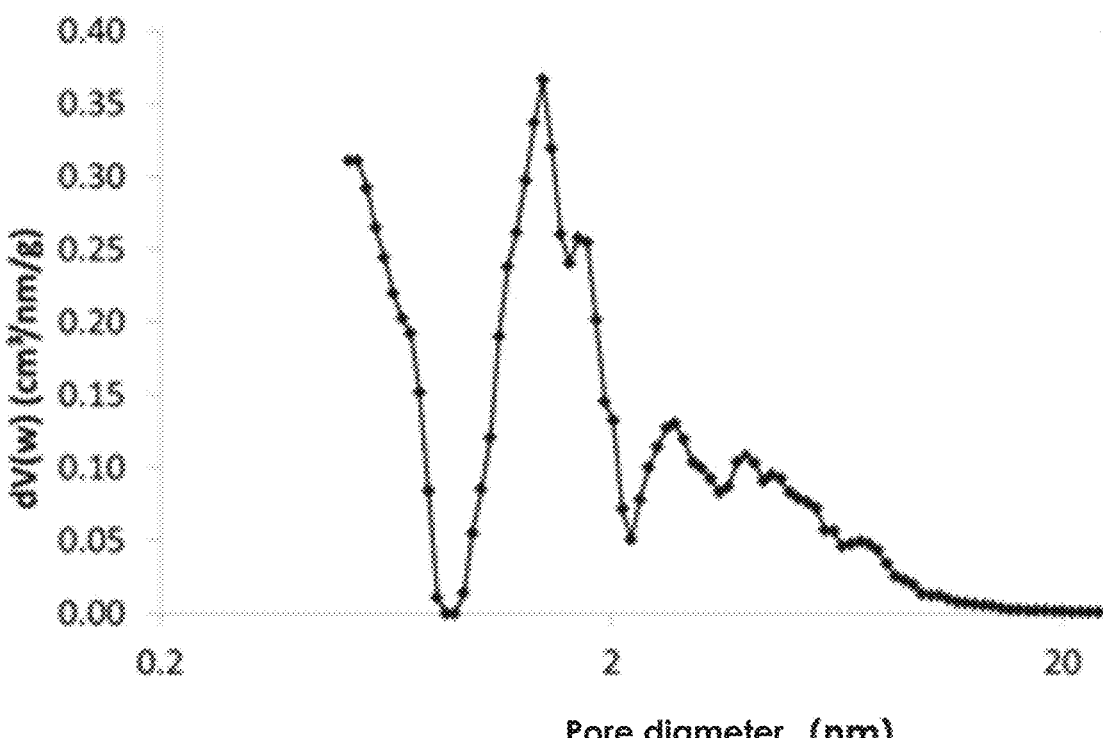
FIG. 2 is a graph showing the pore size distribution (micropore volume to pore width distribution) of the nanoporous carbonaceous material C-Granular (GAC), available from Cabot Norit, calculated from high-resolution nitrogen adsorption isotherms at 77.4K.

The pore distribution was then measured. As shown in FIG. 2, pore distribution is between 0.5 and 35 with very few pores with a diameter larger than 20 nm.

Figures 3, 4:
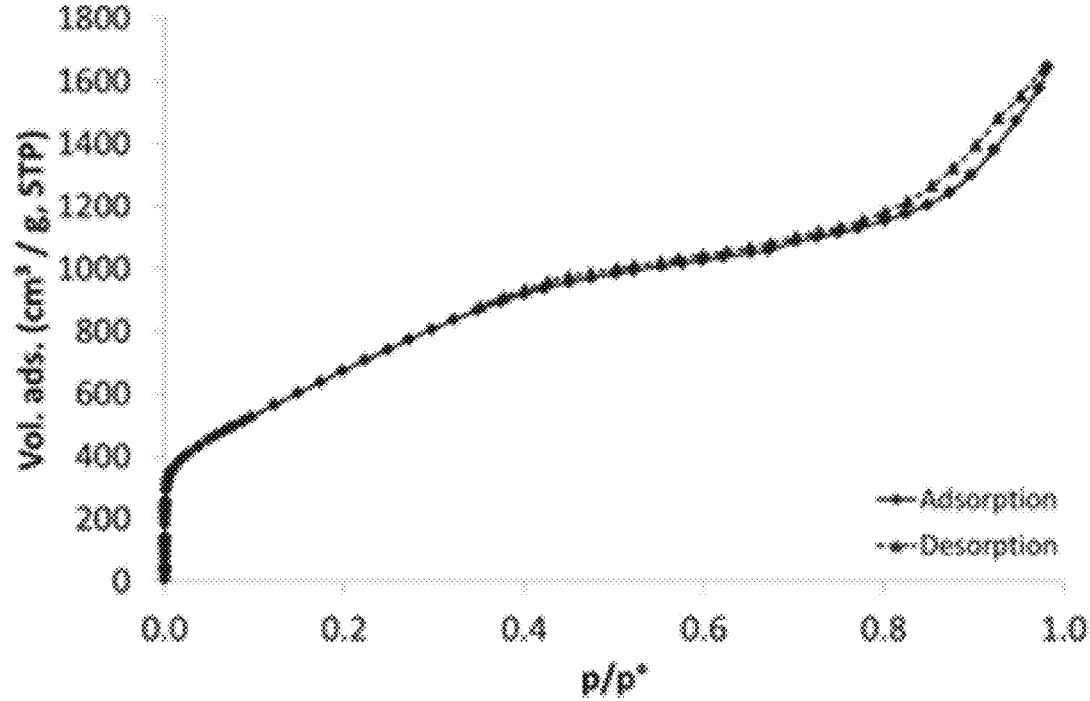
FIG. 3 is a table containing the BET surface area, micropore volume and mesopore volume of the nanoporous carbonaceous material C-Granular (GAC), available from Cabot Norit, calculated from high-resolution nitrogen adsorption isotherms at 77.4K.
FIG. 4 is a graph showing the nitrogen adsorption isotherms (adsorbed micropore volume to relative pressure) of the nanoporous carbonaceous material F5001 available from Blucher, calculated from high-resolution nitrogen adsorption isotherms at 77.4K.

The main textural and surface chemistry properties of C-Granular were measured and are shown in FIG. 3: the surface area ($S_{BET}$) which is 1143 m²/g, the micropore volume ($V_{DR}$) which is 0.38 cm³/g and the mesopore volume which is 0.54 cm³/g.

Example 2: Characterisation of the Pore Structure of the Nanoporous Carbonaceous Material F5001 Available from Blucher, Hereafter Referred to as F5001

A commercial nanoporous carbonaceous material, F5001, which has a large volume of micropores and mesopores, was selected and studied. F5001 was used directly as supplied.

The pore structure was characterised by high-resolution nitrogen adsorption isotherms at 77.4K for F5001. The nanoporous carbonaceous material F5001 was previously degassed at 120° C. for 17 hours in vacuo at a pressure of $10^{-5}$-$10^{-6}$ Torr. Firstly, as can be seen in FIG. 4, nitrogen adsorption was measured on the surface of the nanoporous carbonaceous material until an equilibrium was formed between the nitrogen pressure and the quantity of nitrogen absorbed by F5001.

Figures 5, 6:
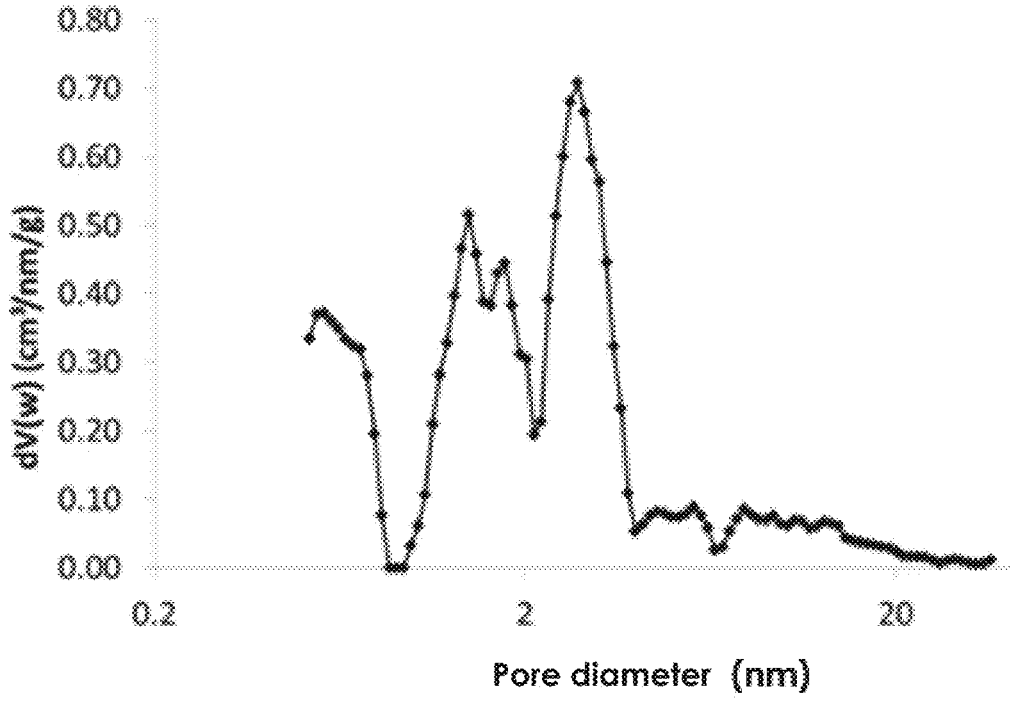
FIG. 5 is a graph showing the pore size distribution (micropore volume to pore width distribution) of the nanoporous carbonaceous material F5001, available from Blucher, calculated from high-resolution nitrogen adsorption isotherms at 77.4K.
FIG. 6 is a table containing the BET surface area, micropore volume and mesopore volume of the nanoporous carbonaceous material F5001, available from Blucher, calculated from high-resolution nitrogen adsorption isotherms.

The pore distribution was then measured. As shown in FIG. 5, pore distribution is between 0.5 and 0.35 with a presence of pores with a diameter greater than 20 nm.

The main textural and surface chemistry properties of F5001 were then measured and are shown in FIG. 6: the surface area ($S_{BET}$) which is 2606 m²/g, the micropore volume ($V_{DR}$) which is 0.85 cm³/g and the mesopore volume which is 1.83 cm³/g.

Example 3: Liquid Phase Equilibrium Adsorption Capacities of C-Granular or F5001 by $NH_4ClO_4$ Firstly, two samples of C-Granular and F5001 were degassed at 120° C. for 17 hours in vacuo ($10^{-2}$ Torr). Two aqueous solutions including $NH_4ClO_4$ were then prepared. The first aqueous solution is a solution saturated with $NH_4ClO_4$ at 20° C., the second solution is a 1:10 dilution of the solution saturated with $NH_4ClO_4$ at 20° C.

C-Granular

A first sample of 250±10 mg of C-Granular was immersed in 20±1 ml of said solution saturated with $NH_4ClO_4$, to allow stabilisation under stirring for 6 days at room temperature (20±1° C.). The same immersion method was performed with 250±10 mg of C-Granular a second time with said 1:10 dilution of the solution saturated with $NH_4ClO_4$.

Figure 7:
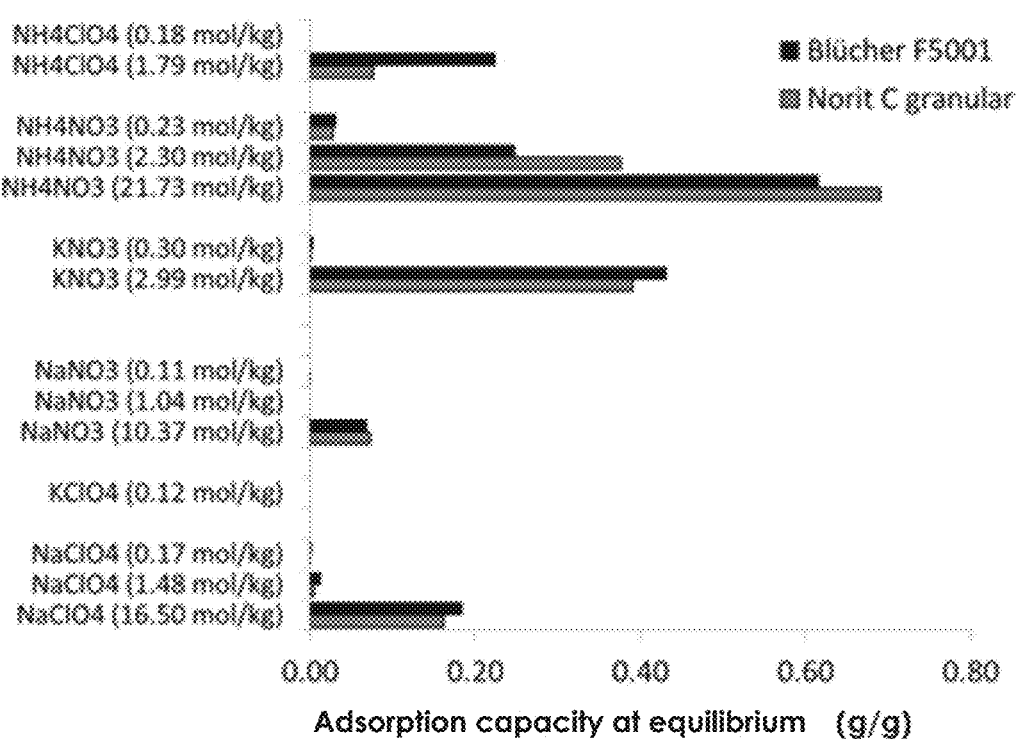
FIG. 7 is a graph of the equilibrium adsorption capacity of different oxidisers ($NH_4ClO_4$, $NH_4NO_3$, $KNO_3$, $NaNO_3$, $KClO_4$, $NaClO_4$) on the nanoporous carbonaceous material C-Granular (GAC), available from Cabot Norit, and the nanoporous carbonaceous material F5001 available from Blucher.

As shown in FIG. 7, the molality of said solution saturated with $NH_4ClO_4$ is 1.79 mol/kg, the molality of said 1:10 dilution of the solution saturated with $NH_4ClO_4$ is 0.18 mol/kg.

Equilibrium adsorption capacities were measured by comparing the $NH_4ClO_4$ concentration of the aqueous solution before and after contact with C-Granular. This experiment was performed in duplicate. The $NH_4ClO_4$ concentrations of the aqueous solution before and after contact with C-Granular were measured gravimetrically, by collecting a sample of the solution, carefully evaporating the water in the sample to a constant mass and weighing the mass of residual salt. The mass fraction of salt in the collected sample was then calculated.

F5001

A first sample of 250±10 mg of F5001 was immersed in 20±1 ml of said solution saturated with $NH_4ClO_4$, to allow stabilisation under stirring for 6 days at room temperature (20±1° C.). The same immersion method was performed with 250±10 mg of F5001 a second time with said 1:10 dilution of the solution saturated with $NH_4ClO_4$.

As shown in FIG. 7, the molality of said solution saturated with $NH_4ClO_4$ is 1.79 mol/kg, the molality of said 1:10 dilution of the solution saturated with $NH_4ClO_4$ is 0.18 mol/kg.

Equilibrium adsorption capacities were measured by comparing the $NH_4ClO_4$ concentration of the aqueous solution before and after contact with F5001. This experiment was performed in duplicate. The $NH_4ClO_4$ concentrations of the aqueous solution before and after contact with C-Granular were measured gravimetrically, by collecting a sample of the solution, carefully evaporating the water in the sample to a constant mass and weighing the mass of residual salt. The mass fraction of salt in the collected sample was then calculated.

The results for $NH_4ClO_4$ in FIG. 7 show that the two nanoporous carbonaceous materials C-Granular and F5001, which have different textural properties and surface chemistry, have different equilibrium adsorption capacities with significant adsorption for F5001 and are not dependent on textural properties and surface chemistry.

Example 4: Liquid Phase Equilibrium Adsorption Capacities of C-Granular or F5001 by $NH_4NO_3$ Firstly, three samples of C-Granular and F5001 were degassed at 120° C. for 17 hours in vacuo ($10^{-2}$ Torr). Three aqueous solutions comprising $NH_4NO_3$ were then prepared. The first aqueous solution is a solution saturated with $NH_4NO_3$ at 20° C., the second solution is a 1:10 dilution of the solution saturated with $NH_4NO_3$ at 20° C. and the third solution is a 1:100 dilution of the solution saturated with $NH_4NO_3$ at 20° C.

C-Granular

A first sample of 250±10 mg of C-Granular was immersed in 20±1 ml of said solution saturated with $NH_4NO_3$, to allow stabilisation under stirring for 6 days at room temperature (20±1° C.). The same immersion method was performed with 250±10 mg of C-Granular a second time with said 1:10 dilution of the solution saturated with $NH_4NO_3$ and lastly a third time with said 1:100 dilution of the solution saturated with $NH_4NO_3$.

As shown in FIG. 7, the molality of said solution saturated with $NH_4NO_3$ is 21.73 mol/kg, the molality of said 1:10 dilution of the solution saturated with $NH_4NO_3$ is 2.30 mol/kg and the molality of said 1:100 dilution of the solution saturated with $NH_4NO_3$ is 0.23 mol/kg.

Equilibrium adsorption capacities were measured by comparing the $NH_4NO_3$ concentration of the aqueous solution before and after contact with C-Granular. This experiment was performed in duplicate. The $NH_4NO_3$ concentrations of the aqueous solution before and after contact with C-Granular were measured gravimetrically, by collecting a sample of the solution, carefully evaporating the water in the sample to a constant mass and weighing the mass of residual salt. The mass fraction of salt in the collected sample was then calculated.

F5001

A first sample of $250\pm10$ mg of F5001 was immersed in $20\pm1$ ml of said solution saturated with $NH_4NO_3$, to allow stabilisation under stirring for 6 days at room temperature ($20\pm1°$ C.). The same immersion method was performed with $250\pm10$ mg of F5001 a second time with said 1:10 dilution of the solution saturated with $NH_4NO_3$ and lastly a third time with said 1:100 dilution of the solution saturated with $NH_4NO_3$.

As shown in FIG. 7, the molality of said solution saturated with $NH_4NO_3$ is 21.73 mol/kg, the molality of said 1:10 dilution of the solution saturated with $NH_4NO_3$ is 2.30 mol/kg and the molality of said 1:100 dilution of the solution saturated with $NH_4NO_3$ is 0.23 mol/kg.

Equilibrium adsorption capacities were measured by comparing the $NH_4NO_3$ concentration of the aqueous solution before and after contact with F5001. This experiment was performed in duplicate. The $NH_4NO_3$ concentrations of the aqueous solution before and after contact with C-Granular were measured gravimetrically, by collecting a sample of the solution, carefully evaporating the water in the sample to a constant mass and weighing the mass of residual salt. The mass fraction of salt in the collected sample was then calculated.

The results for $NH_4NO_3$ in FIG. 7 show that the two nanoporous carbonaceous materials C-Granular and F5001, which have different textural properties and surface chemistry, have similar equilibrium adsorption capacities with significant adsorption when the aqueous solution is saturated with $NH_4NO_3$ and when the aqueous solution saturated with $NH_4NO_3$ is diluted to 1:10. The results show that the equilibrium adsorption capacities are not dependant on textural properties and surface chemistry.

Example 5: Liquid Phase Equilibrium Adsorption Capacities of C-Granular or F5001 by $KNO_3$ Example 3 was reproduced, replacing the oxidiser with $KNO_3$.

As shown in FIG. 7, the molality of said solution saturated with $KNO_3$ is 2.90 mol/kg, the molality of said 1:10 dilution of the solution saturated with $KNO_3$ is 0.30 mol/kg.

The results for $KNO_3$ in FIG. 7 show that, although the two nanoporous carbonaceous materials C-Granular and F5001 have different textural properties and surface chemistry, their equilibrium adsorption capacities have very similar values and are not dependant on textural properties and surface chemistry. The results also show that there is significant adsorption of $KNO_3$ by C-Granular and F5001 when the aqueous solution is saturated with $KNO_3$.

Example 6: Liquid Phase Equilibrium Adsorption Capacities of C-Granular or F5001 by $NaNO_3$ Example 4 was reproduced, replacing the oxidiser with $NaNO_3$.

As shown in FIG. 7, the molality of said solution saturated with $NaNO_3$ is 10.37 mol/kg, the molality of said 1:10 dilution of the solution saturated with $NaNO_3$ is 1.04 mol/kg and the molality of said 1:100 dilution of the solution saturated with $NaNO_3$ is 0.11 mol/kg.

The results for $NaNO_3$ in FIG. 7 show that, although the two nanoporous carbonaceous materials C-Granular and F5001 have different textural properties and surface chemistry, their equilibrium adsorption capacities have very similar values and are not dependant on textural properties and surface chemistry. The results also show that there is significant adsorption of $NaNO_3$ by C-Granular and F5001 when the aqueous solution is saturated with $NaNO_3$.

Example 7: Liquid Phase Equilibrium Adsorption Capacities of C-Granular or F5001 by Sodium Perchlorate ($NaClO_4$)

Example 4 was reproduced, replacing the oxidiser with $NaClO_4$.

As shown in FIG. 7, the molality of said solution saturated with $NaClO_4$ is 16.50 mol/kg, the molality of said 1:10 dilution of the solution saturated with $NaClO_4$ is 1.48 mol/kg and the molality of said 1:100 dilution of the solution saturated with $NaClO_4$ is 0.17 mol/kg.

The results for $NaClO_4$ in FIG. 7 show that, although the two nanoporous carbonaceous materials C-Granular and F5001 have different textural properties and surface chemistry, their equilibrium adsorption capacities have very similar values and are not dependant on textural properties and surface chemistry. The results also show that there is significant adsorption of $NaClO_4$ by C-Granular and F5001 when the aqueous solution is saturated with $NaClO_4$.

These experiments show that $NaClO_4$ is a good oxidiser candidate thanks to its high adsorption capacity on C-Granular and on F5001, its high density and its high oxygen balance (not shown in the figures).

Example 8: Thermal Properties of the Composite Energetic Material $NaClO_4$-C-Granular The thermal properties of $NaClO_4$, C-Granular and the composite energetic material ($NaClO_4$-C-Granular) were measured by DSC experiments on a Q20 instrument (Instruments TA). The instrument was calibrated using the indium melting peak. The experiments were performed at high pressure in stainless steel crucibles sealed with a gold-plated membrane at a temperature increase of 5° C. per minute.

Figure 8:
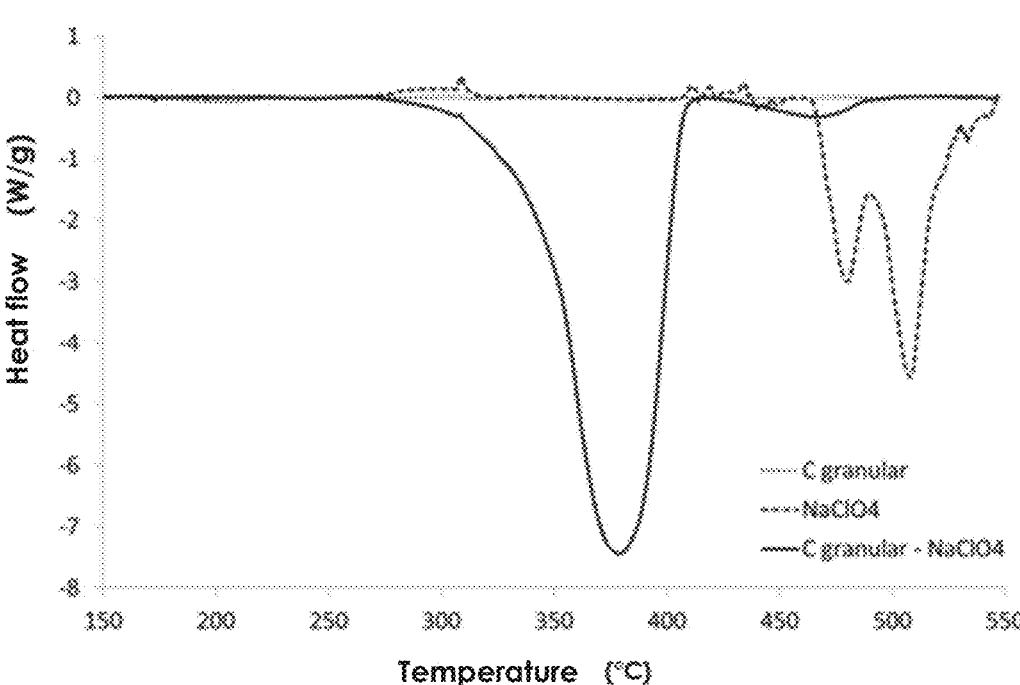
FIG. 8 is a graph showing the DSC curves (heat flux to temperature) of the nanoporous carbonaceous material C-Granular (GAC) available from Cabot Norit, the oxidiser $NaClO_4$ and an energetic material according to the invention (nanoporous carbonaceous material C-Granular (GAC) available from Cabot Norit loaded with the oxidiser $NaClO_4$).

FIG. 8 shows a significant difference between the decomposition initiation temperature of the composite energetic material, which is approximately 320° C., and the decomposition initiation temperature of $NaClO_4$, which is 470° C., which is 150° C. lower than the decomposition initiation temperature of $NaClO_4$ alone.

Example 9

The protocol of the previous examples was reproduced using sodium perchlorate as the inorganic oxidiser on C-Granular and F5001 as the nanoporous carbonaceous material.

Firstly, two samples of C-Granular and F5001 were degassed at 120° C. for 17 hours in vacuo ($10^{-2}$ Torr). Two aqueous solutions comprising $NaClO_4$ were then prepared. The first aqueous solution is a solution saturated with $NaClO_4$ at 20° C., the second solution is a solution supersaturated with $NaClO_4$ at 20° C. obtained by evaporating the solvent.

C-Granular (CC)

A first sample of 250±10 mg of C-Granular was immersed in 20±1 ml of said solution saturated with $NaClO_4$ (66% by weight), to allow stabilisation under stirring for 6 days at room temperature (20±1° C.). The same immersion method was performed with 250±10 mg of C-Granular a second time with said solution supersaturated with $NaClO_4$.

F5001 (FC)

A first sample of 250±10 mg of F5001 was immersed in 20±1 ml of said solution saturated with $NaClO_4$ (66% by weight), to allow stabilisation under stirring for 6 days at room temperature (20±1° C.). The same immersion method was performed with 250±10 mg of F5001 a second time with said solution supersaturated with $NaClO_4$.

A ratio of inorganic oxidiser of 2.2 g/g carbon was obtained for the nanoporous carbonaceous material C-Granular and 3.2 g/g carbon was obtained for the nanoporous carbonaceous material F5001.

Figure 9:
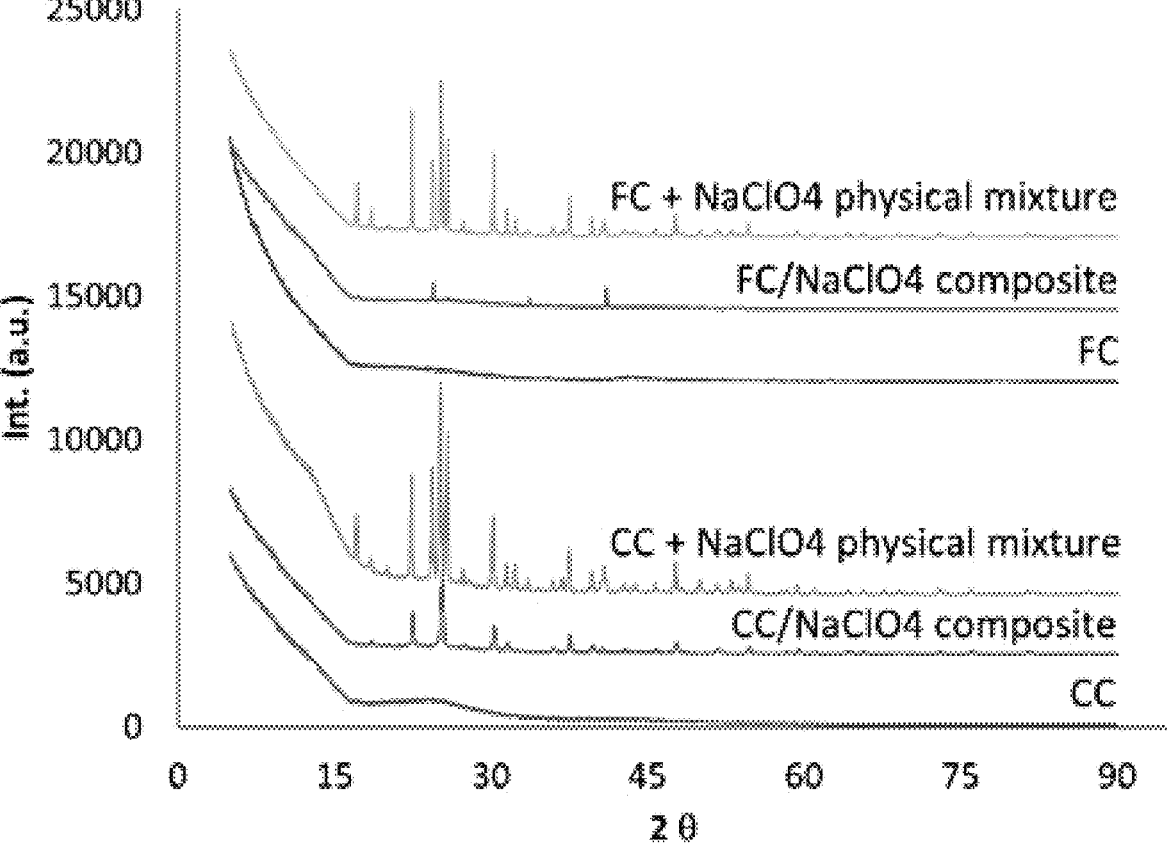
FIG. 9 is the result of an XRD (X-ray diffraction) analysis of the nanoporous carbonaceous material C-Granular (CC) and the material F5001 (FC) as a reference, of the materials according to Examples 9, 10 and Comparative Examples 1 and 2.

Samples of nanoporous carbonaceous material (C-Granular CC and F5001 (FC) without oxidiser were compared by XRD with the energetic material of the example. The results are shown in FIG. 9.

Figure 10:
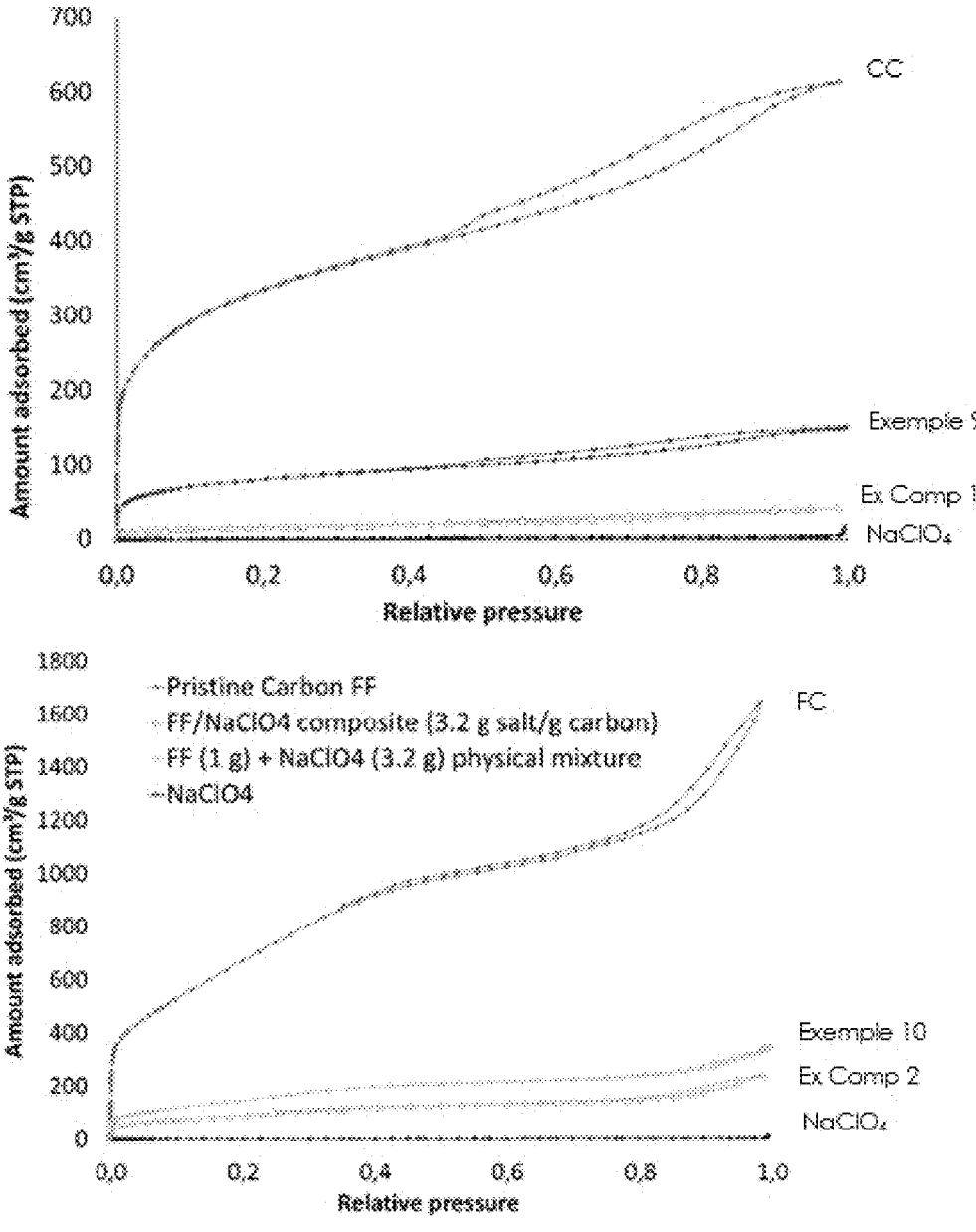
FIG. 10 shows the nitrogen adsorption isotherms (adsorbed micropore volume to relative pressure) of the nanoporous carbonaceous material C-Granular (CC) and the material F5001 (FC) as a reference, of the materials according to Examples 9, 10 and Comparative Examples 1 and 2 calculated by the high-resolution nitrogen adsorption isotherms at 77.4K.

The nitrogen adsorption isotherms (adsorbed micropore volume to relative pressure) of the energetic material of the example and the nanoporous carbonaceous material C-Granular (CC) and F5001 (FC) were also measured, calculated by the high-resolution nitrogen adsorption isotherms at 77.4K. The results are shown in FIG. 10.

The results of the measurements of the BET surface area, micropore volume and mesopore volume of the nanoporous carbonaceous material C-Granular (CC) and F5001 (FC) and materials according to the example are given in FIG. 11.

The change in average pore size (W) evaluated from the pore size distributions obtained using the 2D-NLDFT-HS model of the nanoporous carbonaceous material C-Granular (CC) and F5001 (FC) and the materials according to the example is given in the table of FIG. 12.

Comparative Example 1

A physical mixture was made in which 2.2 g of sodium perchlorate was added per g of nanoporous carbonaceous material C-Granular (CC).

Samples of nanoporous carbonaceous material (C-Granular CC) without oxidiser were compared by XRD with the material of Comparative Example 1. The results are shown in FIG. 9.

The nitrogen adsorption isotherms (adsorbed micropore volume to relative pressure) of the energetic material of Comparative Example 1 and the nanoporous carbonaceous material C-Granular (CC) were also measured, calculated by the high-resolution nitrogen adsorption isotherms at 77.4K. The results are shown in FIG. 10.

The results of measurements of the BET surface area, micropore volume and mesopore volume of the nanoporous carbonaceous material C-Granular (CC) and the material according to the comparative example are given in FIG. 11.

The change in average pore size (W) evaluated from the pore size distributions obtained using the 2D-NLDFT-HS model of the nanoporous carbonaceous material C-Granular (CC) and the material according to the comparative example is given in the table of FIG. 12.

Comparative Example 2

A physical mixture was made in which 3.2 g of sodium perchlorate was added per g of nanoporous carbonaceous material F5001 (FC).

Samples of nanoporous carbonaceous material (F5001-FC) without oxidiser were compared by XRD with the material of Comparative Example 2. The results are shown in FIG. 9.

The nitrogen adsorption isotherms (adsorbed micropore volume to relative pressure) of the energetic material of Comparative Example 2 and the nanoporous carbonaceous material F5001 (FC) were also measured, calculated by the high-resolution nitrogen adsorption isotherms at 77.4K. The results are shown in FIG. 10.

The results of measurements of the BET surface area, micropore volume and mesopore volume of the nanoporous carbonaceous material F5001 (FC) and the material according to the comparative example are given in FIG. 11.

The change in average pore size (W) evaluated from the pore size distributions obtained using the 2D-NLDFT-HS model of the nanoporous carbonaceous material F5001 (FC) (FC) and the material according to the comparative example is given in the table of FIG. 12.

It is understood that the present invention is in no way limited to the embodiments described above and that many modifications may be made without departing from the scope of the appended claims.

The invention claimed is:

1. Composite energetic material comprising at least one nanoporous material and at least one inorganic oxidiser, characterised in that said nanoporous material is a nanoporous carbonaceous material, said composite energetic material has a decomposition initiation temperature on a thermogram obtained by differential scanning calorimetry of less than 5° C./minute in a closed crucible (DSC peak start temperature) preferably from 50° C. to 200° C., more preferably from 100° C. to 150° C., relative to the decomposition initiation temperature on the DSC thermogram of the inorganic oxidiser, and has at least 30% of the porosity occupied by said inorganic oxidiser, and at most 90% of the porosity occupied by said inorganic oxidiser, said energetic material having an impact sensitivity of at least 2 J, wherein said nanoporous carbonaceous material comprises a network of interconnected pores in a three-dimensional arrangement of pores which extend through the volume of said nanoporous carbonaceous material, said nanoporous carbonaceous material comprises micropores with a pore size not exceeding 2 nm, mesopores with an intermediate size of between 2 and 50 nm and macropores with a pore size of greater than 50 nm and less than 100 nm; and said nanoporous carbonaceous material having a volume of micropores of between 0.1 $cm^3$/g and 1.0 $cm^3$/g and a volume of mesopores of between 0.05 $cm^3$/g and 3.0 $cm^3$/g, calculated based on the pore size distribution modelled by 2D-NLDFT-HS (non-linear DFT) or QSDFT (quench-state DFT) applied to nitrogen adsorption isotherms at 77.4K.

2. Composite energetic material according to claim 1, having a bulk density greater than or equal to 1.0 g/cm3.

3. Composite energetic material according to claim 1, having a micropore volume of pores with a diameter of less than 2 nm of between 0.01 cm3/g and 1.0 cm3/g, calculated by applying the Dubinin-Radushkevitch model applied to nitrogen adsorption isotherms at 77.4K.

4. Composite energetic material according to claim 1, comprising a mesopore volume of pores with a diameter of between 2 nm and 50 nm of between 0.05 cm3/g and 3.0 cm3/g, calculated based on the pore size distribution modelled by 2D-NLDFT-HS (2D non-linear DFT HS) or QSDFT (quench-state DFT) applied to nitrogen adsorption isotherms at 77.4K.

5. Composite energetic material according to claim 1, wherein said nanoporous carbonaceous material is granular with a D90 greater than or equal to 160 microns and a D10 greater than or equal to 900 microns.

6. Composite energetic material according to claim 1, wherein said carbonaceous material is in power form.

7. Composite energetic material according to claim 6, wherein the average particle size d50 is between 25 μm and 50 μm.

8. Composite energetic material according to claim 1, wherein said carbonaceous material is a monolith.

9. Composite energetic material according to claim 1, wherein said inorganic oxidiser is selected from the group of salts of the general formula XaZbOc where a and b are integers between 0 and 5, and where c represents an integer between 1 and 8, with X representing a counter anion selected from Na, K, NH4, Li, H, Ca, Mg, Al or Fe, as well as combinations thereof, with Z representing Mn, Cl, N, S, I, P and O representing oxygen.

10. Energetic formulation comprising the composite energetic material according to claim 1.

11. Energetic formulation according to claim 10, further comprising at least one conventional additive.

12. Energetic formulation according to claim 11, being an explosive energetic formulation or a propellant energetic formulation.

13. Method of producing a composite energetic material according to claim 1 comprising the following steps:

a) Immersing said at least nanoporous material in said at least one oxidiser present in a fluid;

b) Impregnating said at least one nanoporous material with said at least one oxidiser present in a fluid;

c) Obtaining a composite energetic material characterised in that said nanoporous material is a nanoporous carbonaceous material; and in that said impregnation step comprises an adsorption of said at least one oxidiser in the micropores, mesopores and macropores forming a core at a temperature of between 0 and 50° C., between 15 and 30° C., preferably between 18 and 28° C., more preferably between 20 and 26° C., said adsorption being followed by a filling of the free micropores, mesopores and macropores by said oxidiser.

14. Method according to claim 13, wherein said composite energetic material contains a ratio of the free oxygen atomic fraction of the oxidiser to the carbon contained in the nanoporous carbonaceous material of between 0.5 and 2.5, preferably between 1 and 2.2 and more preferably around 2.

15. Method according to claim 13, wherein a minimum carbon content of said nanoporous carbonaceous material included in the composite energetic material according to the present invention is greater than 70% by weight of carbon, preferably greater than 80% by weight of carbon, more preferably greater than 90% by weight of carbon relative to the total weight of said nanoporous carbonaceous material.

16. Method according to claim 13, wherein said fluid is a liquid phase comprising said inorganic oxidiser in a solvent.

17. Method according to claim 16, wherein said liquid phase is a saturated colloidal solution or suspension of said inorganic oxidiser.

18. Method according to claim 13, wherein the filling of the free micropores, mesopores and macropores is performed by evaporation, filtration, vaporisation, extraction, lyophilisation, cryodesiccation or a combination thereof.

19. Method according to claim 13, comprising, before obtaining the composite energetic material, a rinsing step with a rinsing solvent and a removal of the rinsing solvent, optionally loaded with excess inorganic oxidiser, by evaporation, filtration, vaporisation, extraction, lyophilisation, cryodesiccation, drying or a combination thereof.

20. Method according to claim 13, wherein the nanoporous carbonaceous material is immersed in said fluid under stirring.

21. Method according to claim 13, wherein said inorganic oxidiser is selected from the group of salts of the general formula XaZbOc where a and b are integers between 0 and 5, and where c represents an integer between 1 and 8, with X representing a counter anion selected from Na, K, NH4, Li, H, Ca, Mg, Al or Fe as well as combinations thereof, with Z representing Mn, Cl, N, S, P, I and O representing oxygen.

22. Method according to claim 13, wherein said nanoporous carbonaceous particles have a micropore volume of pores with a diameter less than or equal to 2 nm of between 0.1 cm3/g and 1.0 cm3/g, calculated by applying the Dubinin-Radushkevitch model applied to a nitrogen adsorption isotherm at 77.4K.

23. Method according to claim 13, wherein said nanoporous carbonaceous particles have a mesopore volume of pores with a diameter of between 2 nm and 50 nm of between 0.05 cm3/g and 3.0 cm3/g, calculated based on the pore size distribution modelled by NLDFT (non-linear DFT) or QSDFT (quench-state DFT) applied to a nitrogen adsorption isotherm at 77.4K.

24. Method according to claim 13, wherein said nanoporous carbonaceous material is granular, with a D90 greater than or equal to 160 microns and a D10 greater than or equal to 900 microns.

25. Method according to claim 13, wherein said nanoporous carbonaceous material is in powder form.

26. Method according to claim 25, wherein particle size is between 25 μm and 50 μm.

27. Method according to claim 13, wherein said nanoporous carbonaceous material is in monolithic form.

28. Method according to claim 13, wherein said recovered composite energetic material has a bulk density greater than or equal to 1.0 g/cm3, preferably greater than or equal to 1.25 g/cm3, more preferably greater than 1.35 g/cm3 and even more preferably greater than 1.5 g/cm3.

29. Energetic formulation according to claim 11, wherein said additive is an energetic or non-energetic plasticiser, a shaping material, a stabiliser, an oxidiser, a flash suppressor or graphite.

* * * * *